United States Patent [19]
Wallrafen

[11] Patent Number: 5,442,865
[45] Date of Patent: Aug. 22, 1995

[54] PASSIVE MAGNETIC POSITION SENSOR

[75] Inventor: Werner Wallrafen, Sulzbach/Ts., Germany

[73] Assignee: VDO Adolf Schindling AG, Frankfurt am Main, Germany

[21] Appl. No.: 177,167

[22] Filed: Jan. 4, 1994

[30] Foreign Application Priority Data

Mar. 24, 1993 [DE] Germany .................. 43 09 442.2

[51] Int. Cl.⁶ .............................................. G01B 7/00
[52] U.S. Cl. .................... 33/708; 33/DIG. 1; 324/207.24
[58] Field of Search ............... 33/708, 706, 702, 703, 33/DIG. 1; 324/207.24

[56] References Cited

U.S. PATENT DOCUMENTS

| 4,586,260 | 5/1986 | Baxter et al. | 33/706 |
| 5,074,053 | 12/1991 | West | 33/708 |
| 5,187,630 | 2/1994 | Geisler | 33/708 |

FOREIGN PATENT DOCUMENTS 8804027  6/1988  WIPO ................... 33/706

Primary Examiner—Christopher W. Fulton
Attorney, Agent, or Firm—Martin A. Farber

[57] ABSTRACT

A position sensor has an electrically non-conductive substrate with a resistance layer and a conductor track serving as a potentiometer tap arranged parallel thereto, and a second, electrically conductive substrate. At least one substrate is of resilient construction, and at least one of the substrates has a soft-magnetic layer. A magnet is mounted for guidance in the direction of the conductor track, and is located at a constant distance away from the conductive track. The two substrates are spaced apart at a distance allowing contact to be produced under magnetic action. The resistance layer and the conductor track each have structural parts which engage alternately into each other along a path of movement of the magnet.

11 Claims, 3 Drawing Sheets

PASSIVE MAGNETIC POSITION SENSOR

FIELD AND BACKGROUND OF THE INVENTION

The present invention relates to a position sensor which comprises an electrically non-conductive substrate having a resistance layer and a conductor track serving as a potentiometer tap arranged parallel thereto, and a second, electrically conductive substrate, at least one substrate being of resilient construction.

Potentiometers are known in which conductor track and resistance track are arranged parallel to and galvanically separated from each other on a substrate in order to establish different values of resistance. They can be bridged over by means of another conductor-track section on a second resilient substrate.

The strip-shaped conductor tracks of the variable resistor tap off different voltages in the electric circuit depending at the place where the conductor tracks are contacted with each other. By means of a spacer, the second substrate is maintained at such a distance from the first substrate that a contact space is maintained between the conductor tracks arranged on the substrates. This contact space is bridged over only when pressure is exerted on the outside of one substrate.

In this case, the pressure is produced by mechanical means. For the precise determination of the place of mechanical contact, a magnet arrangement is used.

The continuous mechanical pressure which is produced by the movement of the force-producing means on the resilient substrate results in rapid wear of the positioner.

Furthermore, the structure of the resistance track does not permit a precise determination of the voltage which drops off over the resistor.

SUMMARY OF THE INVENTION

It is an object of the invention to provide a positioner which is low in wear and operates accurately and is furthermore simple to construct, while still permitting a wider range of operating temperatures.

According to the invention, at least one substrate (1, 2) has a soft-magnetic layer, a magnet device (6) is mounted for guidance in the direction of the conductor track (4) at a constant distance away, the two substrates (1, 2) are at such a distance apart that contact is produced under magnetic action, and the resistance layer (3) and the conductor track (4) have structures (3a, 4a) which engage alternately into each other in the direction of movement of the magnet device (6).

Due to the magnetic principle of action, a contactless positioner is obtained which can be universally used due to its robustness and which operates with little wear.

The resistance layer (3) and the conductor track (4) advantageously have coglike structures (3a, 4a).

The soft-magnetic layer is preferably developed as a flexible bar structure (9a) which is supported on one or both sides.

The development of both the resistance and the conductor tracks as well as of the soft-magnetic layer permits a voltage-divider circuit. The position-dependent signal voltage is thus ratiometrically proportional to the supply voltage and substantially independent of the temperature dependencies of the resistors.

The development of the soft-magnetic layer as flexible bars serves to increase the sensitivity and to improve the local resolution.

Spacers (7) are provided between the two substrates to provide the spacing and to avoid an undesired short circuit.

This, however, can also be achieved in the manner that the resistance layer (3) and the conductor track (4) have different layer thicknesses.

In order to improve the reliability of the electrical contact, the soft-magnetic layers are coated with conductive material.

The magnet device is advantageously a permanent magnet, which can be developed as bar magnet or as ring magnet.

According to a feature of the invention, a permanent magnet (6) is opposite the non-magnetic substrate (2).

As materials for the electrically non-conductive substrate (1), ceramic and plastic are particularly suitable.

The invention also has a feature wherein the two substrates (1, 2) are hermetically sealed.

Instead of the resistance track, the comblike structures (3a, 4a) may also have individual resistors between the taps, the resistance of which can be adjusted by laser cut.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
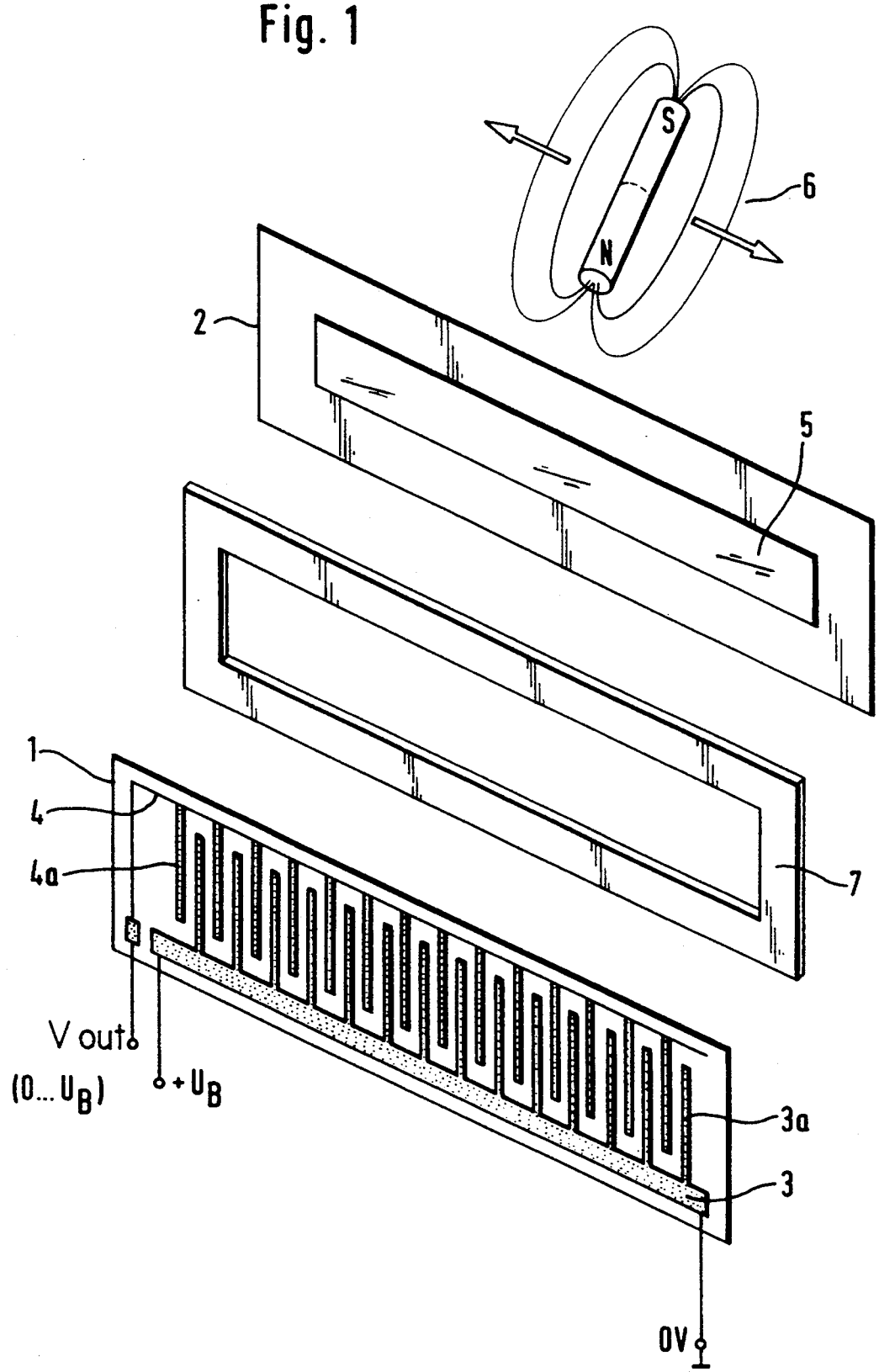
FIG. 1 is an exploded view of a first embodiment of the positioner of the invention.

In the Figures, identical parts have been provided with identical reference numerals.

FIG. 1 shows the construction of a contactless magnetic positioner based on a foil arrangement.

The non-magnetic, electrically non-conductive foil 1 bears the resistance layer in the form of a track 3 and the conductor track 4. The two are arranged parallel to each other and have teeth or coglike structures comprising a set of teeth or tongues which alternately mesh. The parallel tongues 3a and 4a, respectively, of the resistance layer 3 and of the conductor track 4 lie with constant spacing alongside of each other, and consist of a layer of a magnetically soft material, such as Permalloy.

The resistance track 3 consists, for instance of thick-layer material and is preferably electrically connected to ground and the operating voltage $U_B$. The signal voltage $V_{OUT}$ is variable within the range from 0V ... $U_B$ and corresponds to the position of the magnet along the conductor track 4.

Behind the foil 1 there is a spacing frame 7 the outer dimensions of which correspond to the foil 1 and to a plastic foil 2 and assures a distance between the foils 1 and 2 within the μm range.

The plastic foil 2 has an electrically conductive but non-magnetic layer 5 consisting of gold or silver. Facing the rear of the foil 2 there is a permanent magnet 6 which is guided for linear movement in the direction of the variable resistance of the combined foils 1 and 2 and is at a constant distance from the second foil 2.

The permanent magnet 6 is moved in the vicinity of the electrically conductive layer 5. The tongues 3a, 4a of soft-magnetic material which are present on the foil 1 are attracted by the magnetic field of the permanent magnet 6 and contact the electrically conductive layer 5 of the foil 2. Depending on the position in which the permanent magnet 6 produces a short circuit, a specific tap of the resistance track 1 for the connection $V_{OUT}$ is produced at this place.

Figure 2:
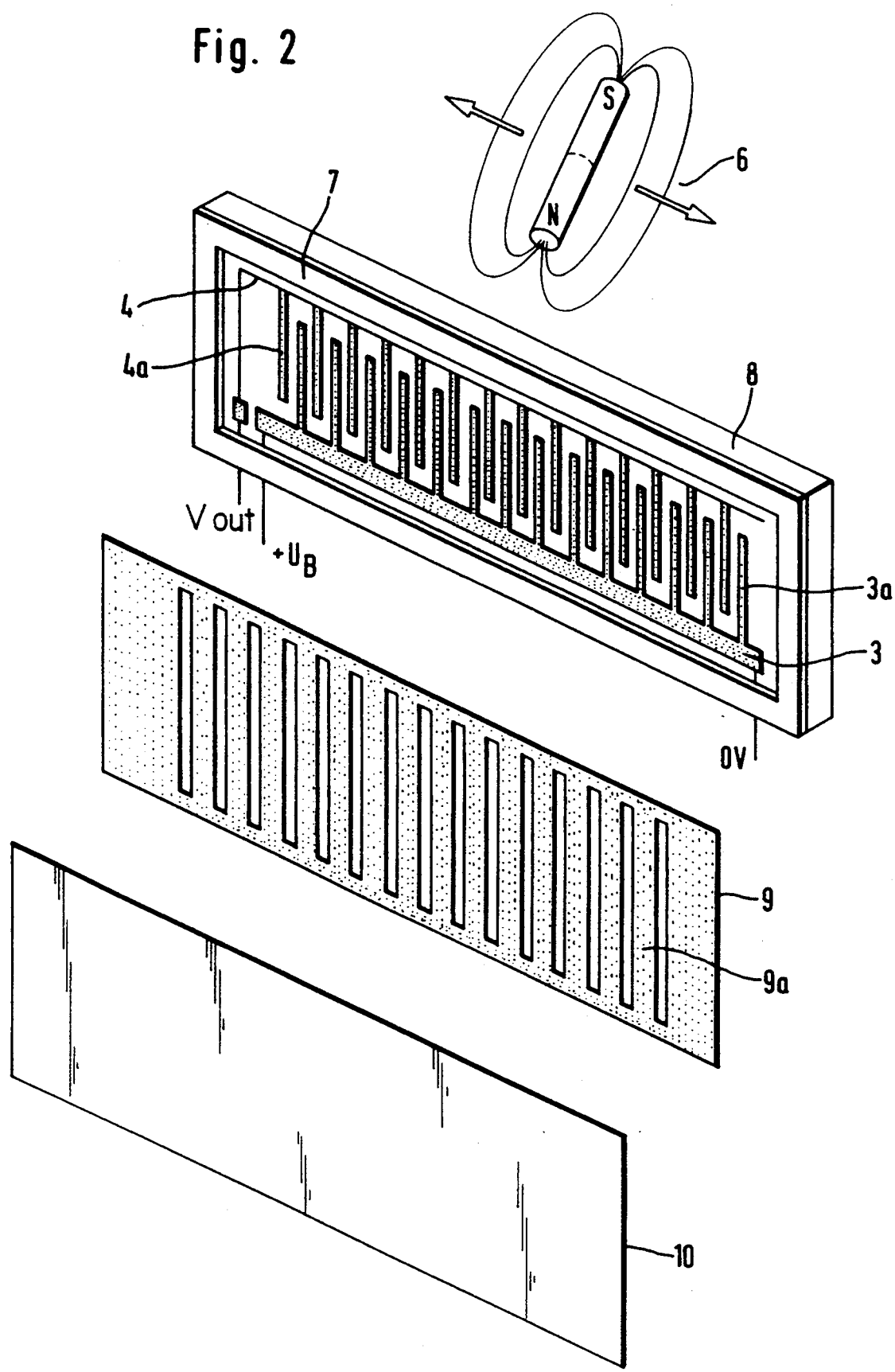
FIG. 2 is an exploded view of a second embodiment of the positioner of the invention.

In accordance with FIG. 2, the resistance track 3 and the conductor track 4 are arranged on a ceramic substrate 8. The advantages of the ceramic substrate reside in the high range of operating temperatures. The geometrical arrangement of the resistance track 3 and of the conductor track 4 corresponds to that shown in FIG. 1. The tongues 3a and 4a of resistance track 3 and conductor track 4 lie alternating parallel to each other and consist of electrically conductive material such as gold or silver.

In the region of its edge, the ceramic substrate 8 has a spacing frame 7 the function of which is to maintain a constant distance between the ceramic substrate 8 and a soft-magnetic foil 9 which lies thereon, which distance is bridged over only under the action of the magnetic field of the permanent magnet 6 on the soft-magnetic foil 9 which is provided with flexible bar segments 9a supported on one or both sides.

The soft-magnetic foil 9 is so positioned that each flexible bar segment 9a at the same time covers the tongue 3a of the resistance track 3 and the tongue 4a of the conductor track 4.

For a hermetic sealing of the ceramic substrate 8, a protective strip 10 is provided over the soft-magnetic foil 9.

In this embodiment also, the permanent magnet 6 is guided at a magnetically dependable distance away on the rear of the ceramic substrate 8 along the resistance track 3 and the conductor track 4.

As a result of the magnetic field, the flexible bar segments 9a of the soft-magnetic foil 9 are attracted and thus contact the tongues 3a and 4a.

Here also, the position of the permanent magnet 6 determines which tap of the resistance track 3 applies to the connection $V_{OUT}$.

Figure 3:
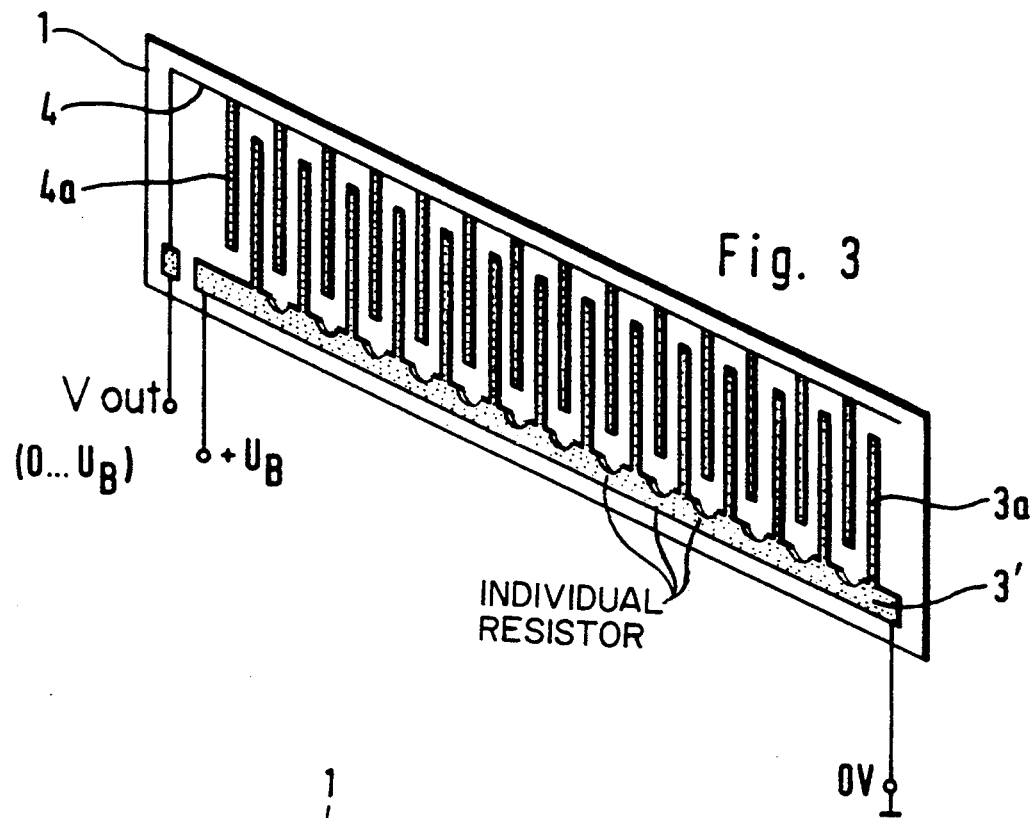
FIG. 3 shows a resistance track of FIG. 1, but modified by cut outs to provide for individual resistors.

Instead of the foregoing resistance track, as shown in FIG. 3, individual resistors between the taps of the coglike structures are also possible. The individual resistors can, in this connection, be adjusted to given resistance values by laser cuts made into a modified track 3'.

Figure 4:
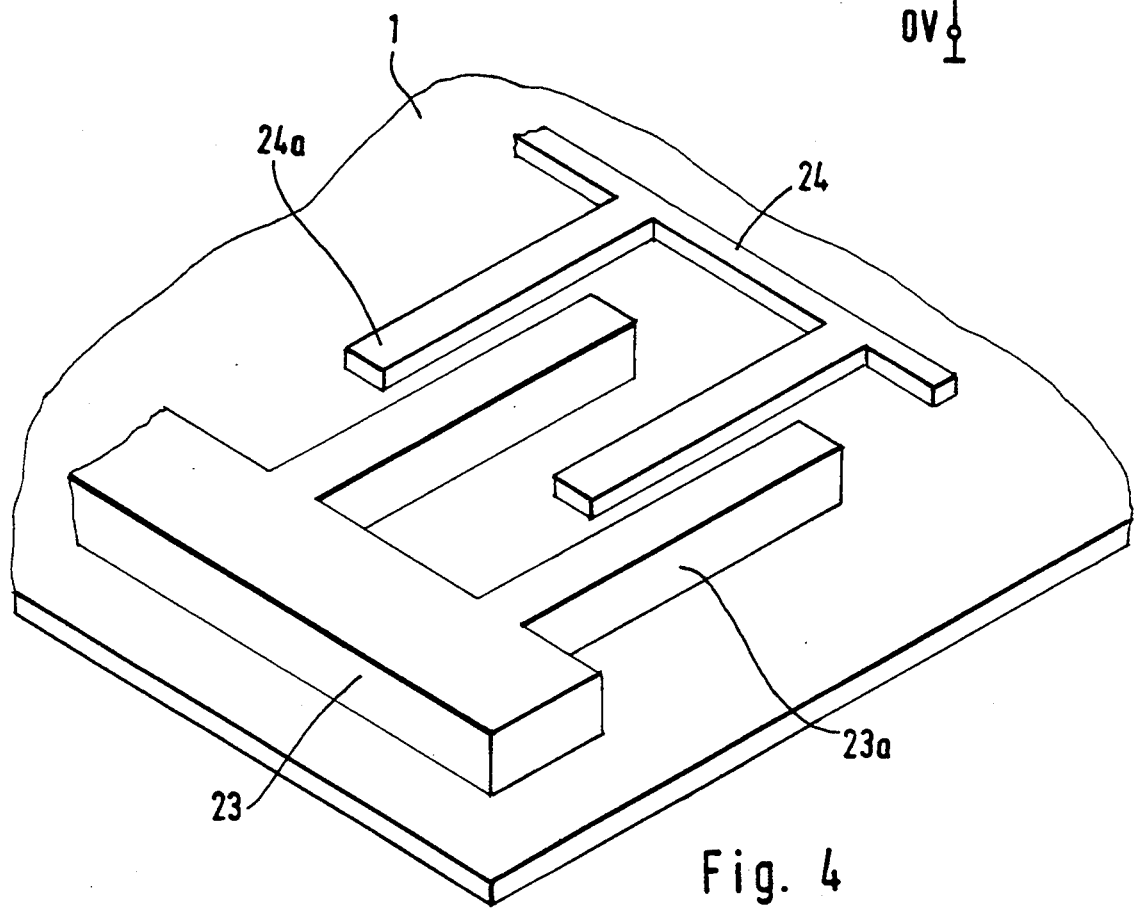
FIG. 4 is a fragmentary view of a non-conductive foil of FIG. 1 in accordance with an alternative embodiment wherein a resistance layer and a conductor track have different layer thickness.

If desired, the resistance layer (3) and the conductor track (4) may be replaced, in an alternative embodiment of the invention, with a resistance layer (23) and a conductor track (24) as shown in FIG. 4 wherein the resistance layer (23) and the conductor track (24), and their corresponding tongues 23a and 24a, have different layer thickness.

The invention offers many possibilities of use in the field of distance or angle measurement, particularly as positioner replacement for wear-sensitive potentiometers.

I claim:

1. A passive contactless magnetic position sensor comprising:

an electrically non-conductive substrate having a resistance layer, and a conductor track serving as potentiometer tap disposed parallel to the resistance layer;

an electrically conductive substrate, at least one of said substrates being of resilient construction; and at least one of said substrates having a soft-magnetic layer;

a magnet device mounted for guidance in the direction of the conductor track, and being spaced apart from the conductive track, the conductive substrate and the non-conductive substrate being spaced apart at a distance allowing contact between the substrates to be produced under magnetic action; and wherein the resistance layer and the conductor track each have structural parts, the structural parts of the conductor track being spaced apart from the structural parts of the resistance layer, the structural parts of the conductor track being interleaved with the structural parts of the resistance layer along a path of movement of the magnet device.

2. A position sensor according to claim 1, wherein the soft-magnetic layer is formed as a flexible bar structure supported on at least one of its sides.

3. A position sensor according to claim 1, further comprising a spacer disposed between the two substrates.

4. A position sensor according to claim 1, wherein the resistance layer and the conductor track have different layer thickness for generating the spacing of the substrates.

5. A position sensor according to claim 1, wherein the magnet device comprises;

a permanent magnet located opposite the non-magnetic substrate.

6. A position sensor according to claim 1, wherein the electrically non-conductive substrate, is made of ceramic or plastic.

7. A passive contactless magnetic position sensor comprising:

an electrically non-conductive substrate having a resistance layer, and a conductor track serving as potentiometer tap disposed parallel to the resistance layer;

an electrically conductive substrate, at least one of said substrates being of resilient construction; and at least one of said substrates having a soft-magnetic layer;

a magnet device mounted for guidance in the direction of the conductor track, and being located at a constant distance away from the conductive track, the two substrates being spaced apart at a distance allowing contact to be produced under magnetic action;

wherein the resistance layer and the conductor track each have structural parts, the structural parts of the conductor track being spaced apart from the structural parts of the resistance layer, the structural parts of the conductor track being interleaved with the structural parts of the resistance layer along a path of movement of the magnet device; and the structural parts of the resistance layer and the conductor track are sets of teeth.

8. A position sensor according to claim 7, wherein each of the structural parts has the configuration of a comb, the position sensor further comprising a plurality of resistors wherein individual ones of the resistors are located between the teeth of a comb.

9. A position sensor according to claim 8, wherein the individual resistors are adjustable by laser cut to provide given resistance values.

10. A passive contactless magnetic position sensor comprising:
   an electrically non-conductive substrate having a resistance layer, and a conductor track serving as potentiometer tap disposed parallel to the resistance layer;
   an electrically conductive substrate, at least one of said substrates being of resilient construction; and at least one of said substrates having a soft-magnetic layer;
   a magnet device mounted for guidance in the direction of the conductor track, and being located at a constant distance away from the conductive track, the two substrates being spaced apart at a distance allowing contact to be produced under magnetic action;
   wherein the resistance layer and the conductor track each have structural parts, the structural parts of the conductor track being spaced apart from the structural parts of the resistance layer, the structural parts of the conductor track being interleaved with the structural parts of the resistance layer along a path of movement of the magnet device;
   the soft-magnetic layer is formed as a flexible bar structure; and
   the soft-magnetic layer is coated with conductive material.

11. A passive contactless magnetic position sensor comprising:
   an electrically non-conductive substrate having a resistance layer, and a conductor track serving as potentiometer tap disposed parallel to the resistance layer;
   an electrically conductive substrate, at least one of said substrates being of resilient construction; and at least one of said substrates having a soft-magnetic layer;
   a magnet device mounted for guidance in the direction of the conductor track, and being located at a constant distance away from the conductive track, the two substrates being spaced apart at a distance allowing contact to be produced under magnetic action;
   wherein the resistance layer and the conductor track each have structural parts, the structural parts of the conductor track being spaced apart from the structural parts of the resistance layer, the structural parts of the conductor track being interleaved with the structural parts of the resistance layer along a path of movement of the magnet device;
   the electrically non-conductive substrate, is made of ceramic or plastic; and
   the two substrates are hermetically sealed.

* * * * *